United States Patent [19]

Koziol et al.

[11] E Patent Number: Re. 32,561

[45] Reissued Date of Patent: Dec. 15, 1987

[54] COATED METAL ANODE FOR THE ELECTROLYTIC RECOVERY OF METALS

[75] Inventors: Konrad Koziol, Rothenbach a.d. Pegnitz; Erich Wenk, Nuremberg, both of Fed. Rep. of Germany

[73] Assignee: Conradty GmbH & Co. Metallelektroden KG, Fed. Rep. of Germany

[21] Appl. No.: 619,778

[22] Filed: Jun. 11, 1984

Related U.S. Patent Documents

Reissue of:

[64] Patent No.: 4,391,695
Issued: Jul. 5, 1983
Appl. No.: 231,165
Filed: Feb. 3, 1981

[51] Int. Cl.[4] ..... C25B 11/02
[52] U.S. Cl. ..... 204/288; 204/290 F
[58] Field of Search ..... 204/290 R, 219, 286, 204/288, 290 F

[56] References Cited

U.S. PATENT DOCUMENTS

| | | | |
|---|---|---|---|
| 3,632,498 | 1/1972 | Beer | 204/290 F |
| 3,676,325 | 7/1972 | Smith et al. | 204/288 |
| 3,725,223 | 4/1973 | De Nora et al. | 204/99 |
| 4,022,679 | 5/1977 | Koziol et al. | 204/286 |
| 4,134,806 | 1/1979 | De Nora et al. | 204/288 X |
| 4,149,956 | 4/1979 | Bess et al. | 204/284 |
| 4,273,642 | 6/1981 | Seilo | 204/288 X |

*Primary Examiner*—Donald R. Valentine
*Attorney, Agent, or Firm*—Lyon & Lyon

[57] ABSTRACT

A coated metal anode for the electrolytic recovery of metals is disclosed, whereby the working surface of this anode is represented by rods 4 which are arranged in a plane in spaced, parallel relationship to each other and which are electrically connected to a current supply rail 3.

To provide a coated metal anode of the identified type, which ensures an operation with acceptable current density and which permits with a simple constructive assembly an energy saving deposit of metal with high purity on the oppositely disposed cathode, the total surface $F_A$ of the rods 4 and the surface $F_p$ assumed by the total arrangement of the rods 4 fulfills the relationship $6 \geqq F_A:F_p \geqq 2$.

15 Claims, 4 Drawing Figures

1
2
3
4
5
9
IV
$L_G$

3
III
4
9

3
3a
4
6
6a
7a
7b
8
9
T
$L_S$ 4
9
A
B

COATED METAL ANODE FOR THE ELECTROLYTIC RECOVERY OF METALS

Matter enclosed in heavy brackets [ ] appears in the original patent but forms no part of this reissue specification; matter printed in italics indicates the additions made by reissue.

*FIELD OF THE INVENTION*

The invention relates to a coated metal anode for the electrolytic recovery of metals, the working surface of which is represented by rods which are arranged in a plane in spaced, parallel relationship to each other, and which are electrically connected to a current supply rail.

*BACKGROUND AND SUMMARY OF THE INVENTION*

In the field of the electrolytic recovery of metals, especially non-ferric metals, from the acidic solutions containing the metal to be recovered, metal anodes should replace anodes of iron or iron alloy. The core of these metal anodes consists of a valve metal, such as e.g. titanium, whereas the coating is formed of e.g. platinum or platinum oxide. The essential advantage of the metal anodes in question is to be seen in the saving of electric energy as compared to the conventional iron or graphite anodes. The saving of energy results from the larger surface obtainable with metal anodes, the high activity of the coating and the stability of form, which permit a considerable reduction in anode voltage. A further operational economy is achieved with metal anodes in that the cleaning and neutralization of the electrolyte is simplified, as the coating of the metal anodes $Cl^-$, $NO_3^-$ or free $H_2SO_4$ is not destroyed. An additional economy in costs results from the fact that with the use of metal anodes, it is not necessary to add expensive additives, e.g. cobalt, to the electrolyte, as is necessary with the use of iron anodes. Furthermore, the contamination of the electrolyte and the recovered metal by iron, which is unavoidable in the case of iron anodes, is no longer applicable. Finally, the metal anodes permit an increase in current density and thus in productivity.

In a known metal anode of the given type (German laid open application DE-OS No. 24 04 167), the working surface is represented by vertically arranged rods which are spaced from each other in the vertical plane and are in parallel relationship to each other. The most essential feature of this known anode is that the anode surface opposing the cathode is 1.5 to 20 times smaller than the opposing cathode surface and the anode is operated with a current density which is 1.5 to 20 times greater than the cathode current density. Thus, supposedly, in an economical manner, a relatively pure metal deposit of the desired crystalline structure and purity should be obtained on the cathode. The economy with which the known anode should operate should evidently be seen in the fact that on account of the reduced area of the anode as compared to the cathode, the requirement of material for the production of the anode is reduced and thus expensive material saved. The reduction in costs is paid for dearly in production, however, by considerable disadvantages.

The considerably reduced surface of the known anode as compared to the cathode, and the resultant necessity to work with high current densities, cause the course and uniformity of the current paths in the cell to be very difficult to control. However, a non-uniform distribution and a course of current paths which is not precisely foreseeable result in a non-uniform deposit of the metal on the cathode.

Since the known anode works with a high current density, the anodic portion of the cell voltage is high. This results in the substantial disadvantage of a high energy requirement for the cells equipped with such an anode.

The large current density and the reduced conductor cross-section of the known anode on account of the reduced surface and thus of the small volume cause a large inner IR drop, which results in a further increase of the necessary electric energy. In order to eliminate this disadvantage, the known anodes require a plurality of current supply rails of complicated construction and guidance, which considerably increase the construction costs.

In the known anodes, the rods are formed with a round profile, i.e. they have a circular cross-section. Thus, a considerable portion of the surface of the rods which bear the active coating lie outside the vision of the cathode in the current shadow region. This portion of the surface of the rods contributes very little to the working surface of the anode. Thus, the known anode has only a small degree of efficiency due to the reduced utilization of the coating, i.e. the working surface of the anode.

Furthermore, the known anode has the disadvantage that the sensitive and expensive coating on the round rods is relatively freely accessible with the consequence that the coating can easily be destroyed mechanically, e.g. when the anode or cathode is being built in or out.

During the assembly and disassembly of the known anodes, also the necessary current supply rails, which extend partly parallel to and partly perpendicular to the rods, have a disadvantageous effect, as they increase the width of the construction so that the danger of damage of both the anode and also the cathode when withdrawing e.g. the anode from the cell is increased.

Furthermore, in the case of the known anodes, no sufficient measures have been taken to form a rigid rod construction so that there is the possibility that the rods will arch out beyond the plane of arrangement resulting in a contact with the cathode and thus a short-circuit.

As compared thereto, it is the object of the invention to provide a coated metal anode of the above-given type, which effects a compromise meeting all the demands between a material-saving construction on the one hand and an operation with acceptable current density on the other hand, and which permits, with a simple, constructive assembly, an energy-saving deposit of metal with high purity on the oppositely disposed cathode.

This object is solved in the case of a coated metal anode of the above-described type in that the total surface of the rods $F_A$ and the surface $F_P$ assumed by the entire arrangement of the rods fulfills the relationship $6 \geqq F_A:F_P \geqq 2$.

The solution according to the invention provides an anode which, on the one hand, offers a large working surface and nevertheless, on the other hand, can be produced with the smallest possible requirement of material. The large working surface permits an operation of the anode according to the invention with relatively small current densities, even upon large application of voltage. This guarantees an energy-saving deposit of the desired metal with great purity on the cathode. The saving in energy is achieved primarily by the reduction of the anodic portion of the cell voltage obtained as compared to the known solutions.

The large surface of the anode according to the invention leads also to a large conductor total cross-section of the rods and thus causes only a relatively small inner voltage drop of the electrical current when flowing through the rods from the current supply rail to the ends of the rods remote therefrom. For this reason, besides the main current supply rail, no further current supply rails are necessary, so that the anode construction according to the invention is not only relatively small, but also material, and thus production costs are saved.

In the anode according to the invention, the rods are arranged vertically in the usual manner. The surface assumed by the rods corresponds approximately with the surface of the cathode facing the anode. Precisely on account of the last-mentioned measure, a uniform, easily controllable distribution of the current paths between anode and cathode results.

An especially advantageous configuration of the anode according to the invention is to be seen in the fact that the rods have an essentially rectangular cross-section and are arranged in such a manner that the larger stretch of the cross-section of the rods extends perpendicular to the arrangement plane assumed by the rods.

Due to this measure, a large portion of the working surface of the anode, i.e. the rods or their coating, respectively, lies perpendicular to the arrangement plane of the rods of the anode, or the surface of the cathode facing the anode, respectively. This results in a series of advantages. One advantage is that the portion of the working surface which lies in the current shadow region out of the vision of the cathode is relatively small. Thus, already geometrically a large effective surface results. This causes an optimal utilization of the coating, and thus a very large physical surface of the anode of the invention. Moreover, a large portion of the coating, namely that on the surfaces of the rods perpendicular to the arrangement plane of the anode, is protected from a mechanical destruction, so that not only can the anode according to the invention be built in and out within any problems, but also the cathode can be withdrawn from and re-inserted into the cell without difficulty. The anode structure according to the invention also reduces the danger of short-circuits and mechanical destructions due to a formation of dendrites on the cathode surface.

It has proven to be advantageous that the ratio of the short side to the long side of the rectangular cross-section of the rods amount to 1:2 to 1:10. In this respect, it is especially expedient if the width B of the rods measured parallel to the arrangement plane amounts to about 0.5 mm to about 2.5 mm. This measure contributes not only to the desired state of the surface ratio, but also permits the use of conventional profiles for the rods and thus a construction favorable to costs and further, a practicable production of the anode.

It is also advantageous with respect to the named aspects that the depth T of the rods measured perpendicular to the anode plane amounts to about 5 mm to 25 mm.

It has also proven to be expedient that the ratio of the width of one of each rods to the distance of two adjacent rods is 1:4 to 1:6. In this respect, it is especially recommendable if the clear distance A between two adjacent rods amounts to $A \geqq 2$ mm. This construction of the anode of the invention permits a good circulation of the electrolyte between the rods.

An especially advantageous constructive configuration of the anode of the invention is to be seen in the fact that the rods lie in a plane with the current supply rail, connect with their one face end to the current supply rail, and both the electrical and mechanical connection of the rods with the current supply rail takes place via at least one connecting strip extending parallel to the latter, the one marginal region of which is connected with the current supply rail and the other marginal region of which is connected with the rods. This solution ensures with a large geometrical surface not only a large mechanical strength of the anode of the invention, but simultaneously a configuration of the electrical connection of the component parts of the anode of the invention in such a manner that at the contact zones the current density or current load always assumes admissible values and thus the drop of voltage in the contact zones is slight, even in the event of long operating times. The attained mechanical strength of the anode of the invention simplifies not only the building in and out of same, but also hinders the danger of short circuits due to an arching out of the anode structure with the consequence of a contact with the cathode.

An especially preferred embodiment of this solution is that on both sides of the current supply rail or the rods, respectively, one connecting strip respectively is arranged. By means of this measure, the current density in the contact zones between the individual component parts of the anode according to the invention can be kept especially low.

It is expedient if the connecting strips are secured to the current supply rails by screw connections. This provides an especially simple exchangeability of the anode arrangement of the invention. It is further possible with this measure to introduce the anode according to the invention instead of e.g. an iron anode using the same current supply rail in a cell already provided. Accordingly, it is especially economical and simple to exchange the conventional iron anodes with a coated metal anode according to the invention.

According to the invention, the screw connection is constructed such that the contact area between the connecting strip or strips and the current supply rail is selected to be so large that the reduction of the contact area caused by the bores of the screw connection have no substantial effect on the current density or current load in the contact area.

Whereas expediently the connecting strips are screwed together with the current supply rail, it is advantageous that the rods are connected to the connecting strips by means of spot-welding. This permits an especially economical connection of the rods to the connecting strips.

In order to increase the mechanical strength of the anode structure of the invention, it is moreover advantageous that the rods are connected with each other by a plurality of crossbars. This especially applies if the successive crossbars are arranged alternatively on the one and on the other side of the rods. In this respect, it is expedient that the crossbar be secured to the rods by means of spot-welding. The crossbars should be integrated extensively into the rod structure so that no projecting edges are formed which would cause an especially rapid formation of dentrite by the cathode. Functionally, this aim can be achieved especially simply if the crossbars are flattened on their outwardly lying surfaces so that these surfaces do not or hardly arches beyond the outline of the anode rods.

Advantageously, the core of the rods is formed of valve metal, especially titanium, whereas the coating is formed of platinum metal and/or platinum metal oxide and/or an electrically conductive, non-stoichiometric oxide and/or a base metal and/or its oxide and/or mixtures of the above substances.

An embodiment of the coated metal anode according to the invention is explained in more detail on the basis of the enclosed drawings. These show:

*DETAILED DESCRIPTION OF THE INVENTION*

Figure 1:
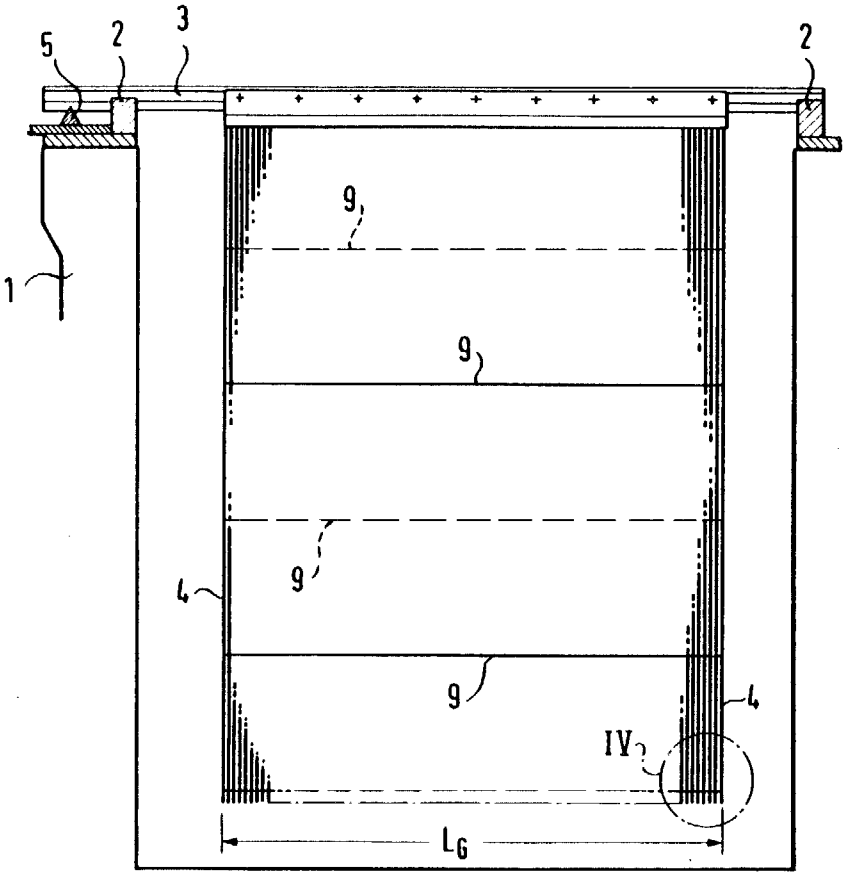
FIG. 1 a plan view of the arrangement plane of the anode according to the invention, FIG. 2 a view of the arrangement according to the invention parallel to the arrangement plane, FIG. 3 an enlarged representation of the detail A of FIG. 2, and FIG. 4 an enlarged representation of the detail B of FIG. 1.
Figure 2:
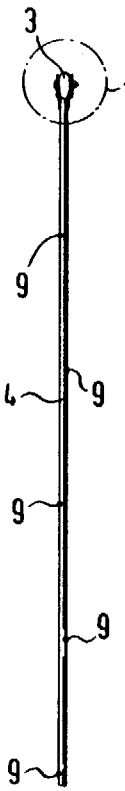

As shown by FIG. 1, a cell tank represented only schematically is indicated with 1. On bearing blocks 2 at the opening edge of the cell tank 1, a current supply rail 3 is positioned, which is connected via a contact rail 5 to the source of current. The current rail 3 bears a series of rods 4, which represents the working surface of the anode. The rods with the length $L_S$ have a rectangular cross-section with the width B and the depth T. In this respect, the rods are orientated such that their depth T extends perpendicular to the arrangement plane of FIG. 1. The surface assumed by the rods is defined by the length of the rods $L_S$ and by the distance $L_G$ of the outer sides of the two outer rods of the anode structure. The rods 4 are arranged with a clear distance A to each other.

Figure 3:
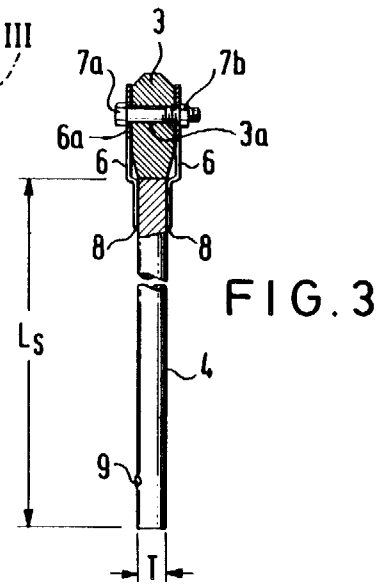
Figure 4:
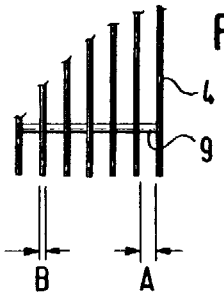

The electrical and mechanical connection of the current supply rail, comprised e.g. of copper, with the rods 4, comprised e.g. of coated titanium, is best shown by FIG. 3. According to same, the current supply rails 3 and the rods 4 are arranged in a plane such that the upper end faces of the rods 4 border against the lower surface of the current supply rail 3. The connection of the current supply rail 3 with the rods 4 takes place via two connecting strips 6 arranged on both sides of the current supply rail and parallel thereto, whereby said strips 6 can also be of coated titanium. The connecting strips 6 are secured by means of screws 7a and nuts 7b to the current supply rail 3. The connection of the rods 4 with the connecting strips 6 takes place by welding spots 8. For the further stiffening of the anode structure, a plurality of crossbars 9, which are also of coated titanium, are connected to the rods 4 by spot welding. In this respect, the successive crossbars 9 are arranged alternatively on the one or the other side of the arrangement plane of the rods 4.

With the described construction, the rods 4 have a length $L_S$ of 1170 mm, whereas their width B is 2 mm and their depth T 12 mm. The clear distance A between two adjacent rods 4 is 8 mm. The entire length $L_G$ of the anode structure is 852 mm. 82 rods are provided.

The described anode is designed for a current of 600 A corresponding with an anode-side current density of 355 A/m$^2$ ($F_p$). With a current of 600 A, merely an IR drop of about 100 mV occurs in the anode.

The anode construction is stiff and robust. This results not only from the described connection of the rods 4 with the current supply rail 3 by means of the connecting strips 6 and from the spot welding of the rods with these connecting strips 6, but also from the additional arrangement of the crossbars 9, which have a diameter of 4 mm in the embodiment. In this manner, each lamella-like rod 4 is held by seven welding spots.

The anode is simple in construction, relatively inexpensive to produce on account of the smallest possible amount of material, and has a very large geometrical surface. Without the current supply rail 3, it weighs about 12 kg. The total surface of the rods $F_A$, to which the coating is applied, is about 3 m$^2$, inclusive of the contacts. The working surface of the anode, i.e. that which immerses in the electrolyte, is about 2.4 m$^2$, which provides at 600 A a $D_A$ value (anodic current density) of about 250 A/m$^2$ ($F_A$). The actual physical anode current density which results from the extremely large BET surface of the coating amounts to only a few 5‰ of the $D_A$ value. Therefrom, and from the catalytic effectivity of the active components of the coating, a constant, low oxygen voltage results at the anode according to the invention for a long period of operation.

The coating of the anode surface which projects from the bath serves for the protection against corrosion of the component parts of the anode consisting of titanium.

The relatively small current load of the current supply rail 3 consisting of copper of about 0.8 A/mm$^2$ with a current of 600 A at the anode permits the provision of nine bores 3a in the current supply rail 3 over a length $L_G$ of 852 mm. Each bore 6a in the connecting strip 6 has a partial current of about 33 A. On account of this small partial current in the contact zones and the good contact coating, the voltage drop in these regions remains constant for long periods of operation.

*It should be understood that other modifications and variations are possible without departing from the spirit of this invention, accordingly the scope of the invention is limited only by the claims which follow.* [We claim]

What is claimed is:

1. A coated metal anode for the electrolytic recovery of metals, the working surface of which is represented by rods which are arranged in a plane in spaced, parallel relationship to each other, and which are electrically connected to a current supply rail, wherein:

said rods lie in a plane with the current supply rail, so as to create a substantially planar rectangular, surface of the anode;

said rods being arranged in such a manner that a larger portion of the area of said rods extends perpendicular to the arrangement plane assumed by said rods than is congruent with said plane; and said rods are connected to said current supply rail at one end face; and both the electrical and mechanical connection of each rod with said current supply rail takes place by means of at least one connecting strip extending parallel to said rod; and wherein one marginal region of said connecting strip is connected with said current supply rail and another marginal region is connected with said rods.

2. The anode according to claim 1, wherein said rods have a substantially rectangular cross-section and are arranged in such a manner that the larger stretch of the cross-section of said rods extends perpendicular to the arrangement plane assumed by said rods.

3. The anode according to claim 2, wherein the ratio of the short side of the rectangular cross-section of said rods to the long side thereof is 1:2 to 1:10.

4. The anode according to claim 3, wherein the width of said (B) of said rods, measured parallel to the arrangement plane, is about 0.5 mm to about 2.5 mm and wherein the depth (T) of said rods, measured perpendicular to the anode plane, is about 5 mm to 25 mm.

5. The anode according to claim 2 wherein the ratio of the width of one of each of said rods to the middle distance between two adjacent rods is between 1:4 to 1:6.

6. The anode according to claim 2 wherein the clear distance (A) between two adjacent rods is $\geqq 2$ mm.

7. The anode according to claims 1 or 2 wherein as to each rod, two connecting strips are connected one along each side of the current supply rail and rod.

8. The anode according to claim 7 wherein each connecting strip is secured to said current supply rail by screw connections.

9. The anode according to claim 8, wherein the contact area between said connecting strip or strips and said current supply rail is selected to be so large that the reduction of the contact area caused by the bores of said screw connection have no substantial effect on the current density or current load, respectively, in said contact area.

10. The anode according to claims 1 or 2 wherein said rods are secured to said connecting strips by means of spot-welding.

11. The anode according to claims 1 or 2 wherein said rods are connected with each other by a plurality of crossbars.

12. The anode according to claim 11, wherein the successive crossbars are arranged alternatively on the one and on the other side of said rods.

13. The anode according to claim 12 wherein said crossbar is secured to said rods by spot-welding.

14. The anode according to claims 1 or 2 wherein the bores of said rods is formed of valve metal, especially titanium, whereas the coating is formed of platinum metal and/or platinum metal oxide and/or an electrically conductive, non-stoichiometric oxide and/or a base metal and/or its oxide and/or mixtures of the above substances.

15. The anode according to claims 1 or 2 wherein the total surface of all the rods $F_A$ and the planar rectangular surface $F_P$ assumed by the total arrangement of the rods fulfills the relationship $6 \geqq F_A : F_P \geqq 2$.

* * * * *